Aug. 10, 1926. 1,595,734
W. H. SCHERER
TRANSFORMER TEMPERATURE INDICATOR
Filed Nov. 23, 1922

WITNESSES:

INVENTOR
William H. Scherer
BY
ATTORNEY

Patented Aug. 10, 1926.

1,595,734

UNITED STATES PATENT OFFICE.

WILLIAM H. SCHERER, OF SPRINGFIELD, MASSACHUSETTS, ASSIGNOR TO WESTINGHOUSE ELECTRIC & MANUFACTURING COMPANY, A CORPORATION OF PENNSYLVANIA.

TRANSFORMER TEMPERATURE INDICATOR.

Application filed November 23, 1922. Serial No. 602,806.

My invention relates to electric transformer-temperature indicators and more particularly to latching mechanisms therefor.

One object of my invention is to provide a temperature indicator that is supported by a thermal responsive element through readily detachably means.

It is another object of my invention to provide a transformer-temperature indicator of simple construction and few parts.

It is a further object of my invention to provide a signal member for a transformer-temperature indicator having a latch and adjusting means mounted thereon.

In the copending application of William M. Bradshaw, Serial No. 429,031, filed December 7, 1921, and assigned to the Westinghouse Electric & Manufacturing Company, is shown and described a temperature indicator for transformers. My invention relates to details of the signal device or semaphore embodied therein.

In the several figures, similar reference numerals indicate like parts.

Figure 1:
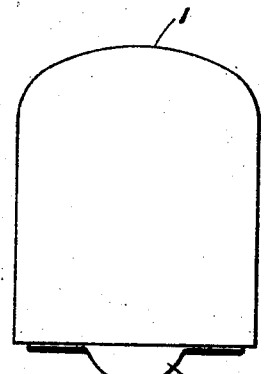
Figure 1 is a face view, in its closed position, of a temperature indicator embodying my invention.
Figure 2:
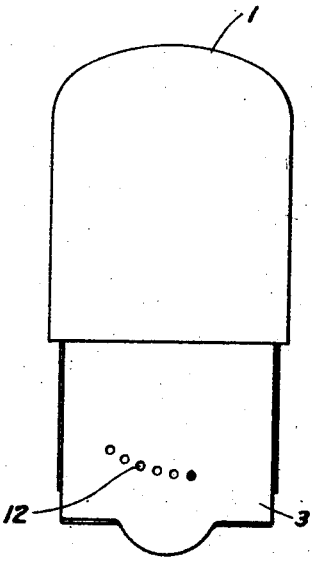
Fig. 2 is a similar view of the same indicator in its open position.

In the preferred embodiment of my invention, a cover 1 is provided for a frame 2 that carries a signal or indicator 3. The frame 2 is supported by a cylinder 4 rotatably mounted within a cylinder 5 which is secured to a threaded bushing 6 for insertion in the transformer casing (not shown). Because of the rotatable connection between the cylinders 4 and 5, the frame 2 tends to assume a vertical position. These features form no part of my invention.

A bimetallic element 7 is rigidly supported, at one end, within the cylinder 4 and is actuated in accordance with the temperature thereof, according to the well known property possessed by bimetallic elements of distortion under changes in temperature. The free end of the bimetallic element 7 co-operates with a hook 8, or latch of a lever 9 that is pivotally mounted, as at 11, on indicator 3. A plurality of recesses of openings 12, which are provided in the indicator body, co-operate with a projection or catch 13 on the end of lever 9.

It is to be observed that the latch 8 is of considerable length and is capable of a substantial rotative movement about its pivotal support 11 without becoming disconnected from the member 7.

Figure 3:
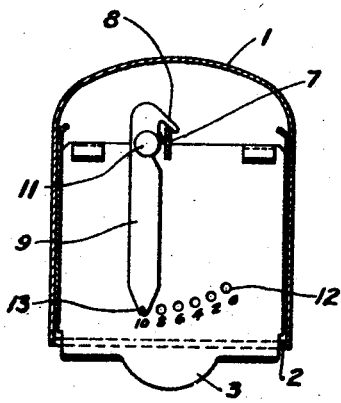
Fig. 3 is a sectional view of the cover member shown in Fig. 1.
Figure 4:
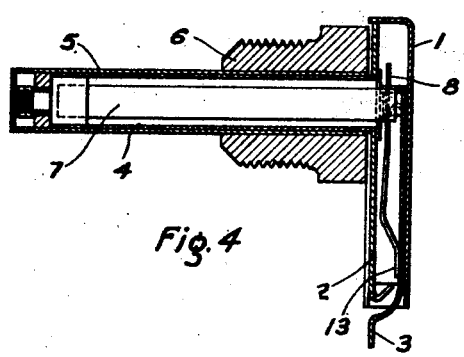
Fig. 4 is a longitudinal sectional view of a temperature indicator embodying my invention.

In the operation of the preferred form of my invention, the bimetallic thermal-responsive element 7 is distorted upon changes in the temperature of the indicator that are produced by the temperature of the fluid in a transformer casing and are, therefore, an indication of the load carried by the transformer. The bimetallic element 7 is so designed that, upon an increase in temperature within the cylinder 4, it tends to become distorted in such manner that its free end is actuated in a direction away from the latch 8. This distortion, if continued for a predetermined space of time, causes bimetallic member 7 to move to the right, as viewed in Fig. 3, from under the latch 8, allowing indicator 3 to fall by the force of gravity, thus showing that the transformer has reached a predetermined thermal condition.

In order to calibrate the point at which the indicator 2 is released, the lever 9 and the catch 13 are adjusted to the proper opening 12, thereby increasing or decreasing the normal overhang of the hook 8 on the bimetallic element 7. Openings 12 may be calibrated in units of temperature, watts or current as desired.

By my invention, it is possible to calibrate the indicator in accordance with changes in seasonal temperatures and the current-carrying capacity of the electrical device.

While I have shown and described a preferred form of my invention, it is to be understood that such changes may be made in the form and arrangement of the component parts thereof as fall within the spirit and scope of my invention, as defined in the accompanying claims.

I claim as my invention:—

1. In a thermal indicating device, a frame, a thermo-responsive element supported by said frame, an indicator mounted on said frame, a member mounted on said indicator for releasably connecting said indicator to said thermo-responsive element, and means on said indicator cooperating with said member for setting the device for a predetermined temperature at which said indicator is to be operated.

2. In a thermal indicating device, a frame, a thermo-responsive element supported by said frame, an indicator mounted on said frame, a member provided with a hook mounted on said indicator, said hook releasably connecting said indicator to said thermo-responsive element and being adjustable to vary the condition at which release occurs, and means on said indicator cooperating with said member for setting the device for a predetermined magnitude of condition at which release is to occur.

3. In a thermal indicator, a frame, a thermo-responsive element supported by said frame, an indicator mounted on said frame, and a member provided with a hook mounted on said indicator, said hook releasably securing said indicator to said thermo-responsive element, and means comprising a catch formed on said member and co-operating openings in the body of said indicator member for varying the relative positions between the hook and said thermo-responsive element.

4. In a thermal indicator, a thermo-responsive member, a signal member, a latch carried by said signal member for releasable attachment to said thermo-responsive member, said signal member being provided with means cooperating with said latch for varying the relative positions between said latch and said thermo-responsive member.

5. In a thermal indicator, a frame, a thermo-responsive element supported by said frame, an indicator mounted on said frame, and a member provided with a hook and an engaging means mounted on said indicator, said hook releasably securing said indicator to said thermo-responsive element, and engaging means formed on the body of said indicator for co-operation with the first-named engaging means for varying the relative positions between the hook and said thermo-responsive element.

In testimony whereof, I have hereunto subscribed my name this eighth day of November, 1922.

WILLIAM H. SCHERER.